(12) United States Patent
Wallace et al.

(10) Patent No.: US 8,984,062 B2
(45) Date of Patent: Mar. 17, 2015

(54) SYSTEM AND METHOD FOR MANAGING HUNT GROUPS

(75) Inventors: Mark E. Wallace, Dublin (IE); Telemaque Ndizihiwe, Dublin (IE); Kieran Gerard Anthony Boland, Newry (IE); Michael Cronin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/825,976

(22) Filed: Jun. 29, 2010

(65) Prior Publication Data
US 2011/0320534 A1    Dec. 29, 2011

(51) Int. Cl.
| | | |
|---|---|---|
| G06F 15/16 | (2006.01) | |
| G06F 15/173 | (2006.01) | |
| H04L 29/08 | (2006.01) | |

(52) U.S. Cl.
CPC ............ *H04L 67/24* (2013.01); *H04L 67/141* (2013.01); *H04L 67/14* (2013.01)
USPC ........................... 709/204; 709/226; 709/229

(58) Field of Classification Search
CPC ............ H04L 12/2856; H04L 12/2859; H04L 12/2874; H04L 29/06027; H04M 3/51; H04M 3/54; H04M 3/56; H04M 3/58; H04M 3/42314
USPC ......... 709/223, 231, 238, 203, 204, 205, 206, 709/224, 226, 228, 229; 455/519; 370/356, 370/270; 379/157, 266.04
See application file for complete search history.

(56) References Cited

U.S. PATENT DOCUMENTS

| | | | | |
|---|---|---|---|---|
| 6,404,885 | B1 * | 6/2002 | Field et al. | 379/266.04 |
| 6,473,501 | B1 * | 10/2002 | Paulsrud | 379/157 |
| 7,187,662 | B1 * | 3/2007 | Klingman | 370/270 |
| 7,613,280 | B1 * | 11/2009 | Lunde et al. | 709/223 |
| 2006/0252444 | A1 * | 11/2006 | Ozugur | 455/519 |
| 2007/0118627 | A1 | 5/2007 | Ozugur et al. | |
| 2007/0121602 | A1 * | 5/2007 | Sin et al. | 370/356 |
| 2010/0067679 | A1 * | 3/2010 | Lei | 379/201.02 |

OTHER PUBLICATIONS http://www.articlesbase.com/communication-articles/combining-call-hunt-groups-and-time-of-day-call-routing-789633.html, James, Kieron, "Combining Call Hunt Groups and Time of Day Call Routing", Feb. 8, 2012, pp. 1-3.
http://www.onsip.com/fatures/hunt-group, "Robust, Enterprise Phone System / OnSIP", Feb. 8, 2012, pp. 1-4.
http://www.andtek.com/communications-products-group-acd.html, "Automatic Call Distribution (ACD) System", Feb. 8, 2012, pp. 1-3.

\* cited by examiner

*Primary Examiner* — Quang N Nguyen
(74) *Attorney, Agent, or Firm* — Holland & Knight LLP; Brian J. Colandreo, Esq.; Jeffrey T. Placker, Esq.

(57) ABSTRACT

A computing device defines one or more hunt groups on a client, wherein the one or more hunt groups are defined based, at least in part, upon information specific to the client. The computing device receives a request for a communication session at the client. The request for the communication session is directed, by the computing device, to one or more members of the one or more hunt groups based, at least in part, upon the one or more defined hunt groups.

18 Claims, 3 Drawing Sheets

SYSTEM AND METHOD FOR MANAGING HUNT GROUPS

TECHNICAL FIELD

This disclosure relates to hunt groups and, more particularly, to a system and method of managing hunt groups on a client.

BACKGROUND

Conventional private branch exchanges may provide a mechanism for an administrator to create, manage, etc., hunt groups, thereby enabling telephone calls placed to a single telephony number to be distributed among a number of lines. Further, Instant Messaging and Presence systems may provide integration with the private branch exchanges to enable features such as "click-to-dial," call routing, and the like. It may often be useful for a unified system to provide a client-based solution such that users may manage hunt groups via such unified systems without the need for administrative action.

SUMMARY OF DISCLOSURE

According to a first implementation, a computer-implemented method includes defining one or more hunt groups on a client, by a computing device, wherein the one or more hunt groups are defined based, at least in part, upon information specific to the client. The computing device receives a request for a communication session at the client. The computing device directs the request for the communication session to one or more members of the one or more hunt groups based, at least in part, upon the one or more defined hunt groups.

One or more of the following features may be included. The information specific to the client may include one or more of: user information, one or more contact lists, and presence information. Presence information may define a status of the one or more members of the one or more hunt groups. Defining the one or more hunt groups may include defining traversal information, wherein traversal information may include one or more of: an order of the one or more members; and presence rules based, at least in part, upon the presence information.

Additionally, directing the request for the communication session may be based, at least in part, upon the traversal information. Defining the one or more hunt groups further includes interfacing with a telephonic communication system. Interfacing with the telephonic communication system may include associating the one or more hunt groups with a telephonic identifier of the one or more members.

According to another implementation, a computer program product includes a computer readable medium having a plurality of instructions stored on it. When executed by a processor, the instructions cause the processor to perform operations including defining one or more hunt groups on a client, wherein the one or more hunt groups are defined based, at least in part, upon information specific to the client. A request for a communication session is received at the client. The request for the communication session is directed to one or more members of the one or more hunt groups based, at least in part, upon the one or more defined hunt groups.

One or more of the following features may be included. The information specific to the client may include one or more of: user information, one or more contact lists, and presence information. The presence information may define a status of the one or more members of the one or more hunt groups. Defining the one or more hunt groups includes defining traversal information, wherein traversal information may include one or more of: an order of the one or more members; and presence rules based, at least in part, upon the presence information.

The request for the communication session may be directed based, at least in part, upon the traversal information. Defining the one or more hunt groups may also include interfacing with a telephonic communication system. Interfacing with the telephonic communication system may include associating the one or more hunt groups with a telephonic identifier of the one or more members.

According to yet another implementation, a computing system includes a processor and a memory module coupled with the processor. A first software module is executable by the processor and the memory module. The first software module is configured to define one or more hunt groups on a client, wherein the one or more hunt groups are defined based, at least in part, upon information specific to the client. A second software module is executable by the processor and the memory module. The second software module is configured to receive a request for a communication session at the client. A third software module is executable by the processor and the memory module. The third software module is configured to direct the request for the communication session to one or more members of the one or more hunt groups based, at least in part, upon the one or more defined hunt groups.

One or more of the following features may be included. Information specific to the client may include one or more of: user information, one or more contact lists, and presence information. Presence information may include a status of the one or more members of the one or more hunt groups. The first software module configured to define one or more hunt groups on a client may be further configured to define traversal information, wherein traversal information may include one or more of: an order of the one or more members; and presence rules based, at least in part, upon the presence information. The third software module configured to direct the request for the communication session may be further configured to direct the request for the communication session based, at least in part, upon the traversal information.

The first software module configured to define one or more hunt groups on a client may be further configured to interface with a telephonic communication system. Interfacing with the telephonic communication system may include associating the one or more hunt groups with a telephonic identifier of the one or more members.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
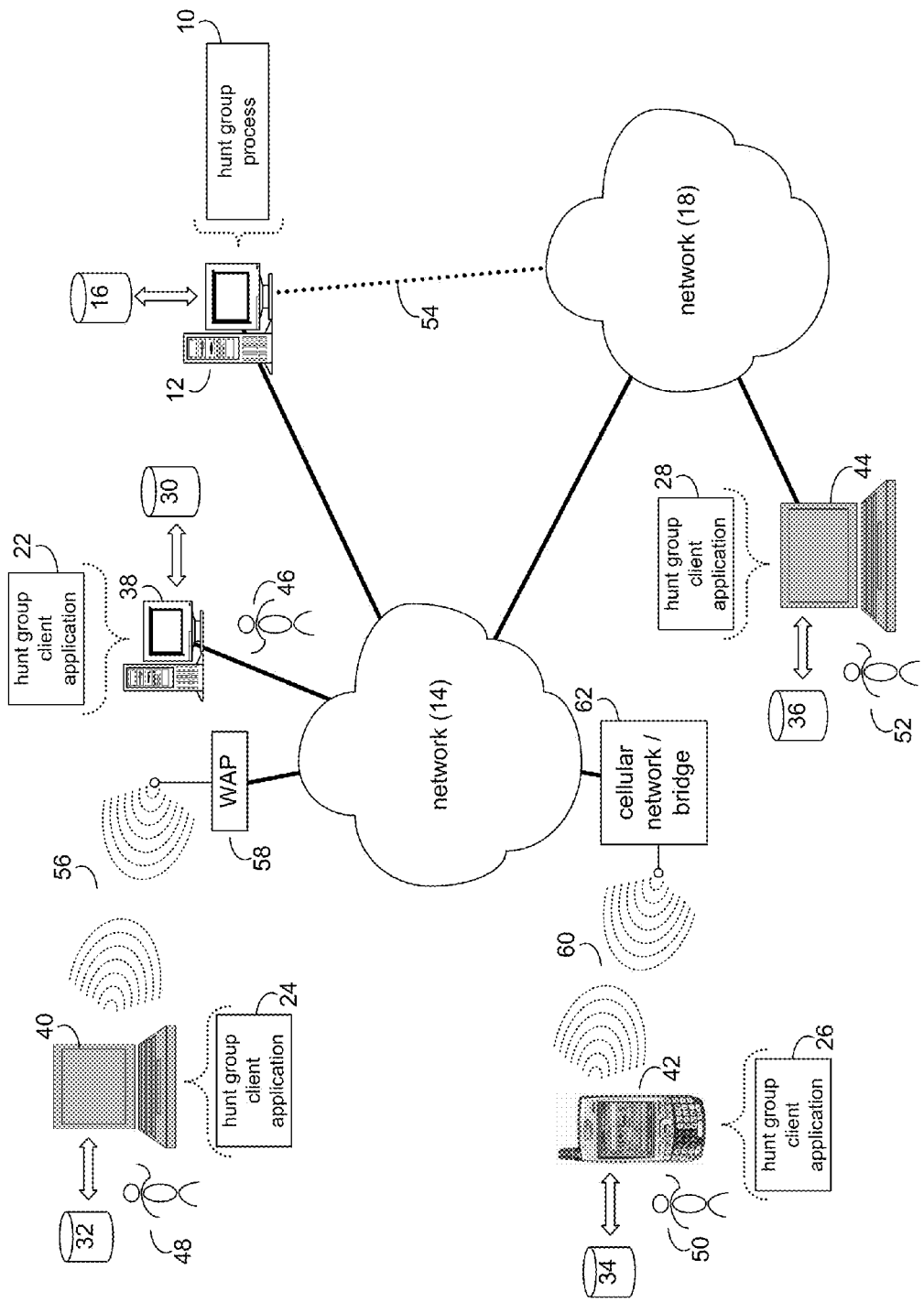
FIG. 1 diagrammatically depicts a hunt group process coupled to a distributed computing system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown hunt group process 10 that may reside on and may be executed by server computer 12, which may be connected to network 14 (e.g., the Internet or a local area network). Examples of server computer 12 may include, but are not limited to: a personal computer, a hand-held computer (e.g., a PDA), a server computer, a series of server computers, a mini computer, and a mainframe computer. Server computer 12 may be a database server (or a series of servers) running a network operating system, examples of which may include but are not limited to: Microsoft® Windows® Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Network 14 may be connected to one or more secondary networks (e.g., network 18), examples of which may include but are not limited to: a local area network; a wide area network; or an intranet, for example.

As will be discussed below in greater detail, hunt group process 10 may define one or more hunt groups on a client, wherein the one or more hunt groups may be defined based, at least in part, upon information specific to the client. Further, hunt group process 10 may receive a request for a communication session at the client. Finally, hunt group process 10 may direct the request for communication to one or members of the one or more hunt groups based, at least in part, upon the one or more defined hunt groups.

The instruction sets and subroutines of hunt group process 10, which may be configured as one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

The instruction sets and subroutines of hunt group client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using hunt group client applications 22, 24, 26, 28, users 46, 48, 50, 52 may, for example, manage hunt groups that may, e.g., be defined on such client applications.

For the purpose of the following description, personal computer 38 may be discussed. However, this is for illustrative purposes only and should not be construed as a limitation of the present disclosure, as one of skill in the art will appreciate that any computing device capable of performing the functions of hunt group process 10 may be utilized.

Users 46, 48, 50, 52 may access hunt group process 10 directly through the device on which the client application (e.g., hunt group client applications 22, 24, 26, 28) is executed, namely client electronic devices 38, 40, 42, 44, for example. Additionally/alternatively, users 46, 48, 50, 52 may access hunt group process 10 directly through network 14 or through secondary network 18. Further, server computer 12 (e.g., one of the computers that may execute hunt group process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11n, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CUD, Red Hat® Linux®, or a custom operating system (Windows CE is a registered trademark of Microsoft Corporation in the United States, other countries, or both).

For the purpose of the following description, hunt group client application 22 may be discussed. However, this is for illustrative purposes only and should not be construed as a limitation of the present disclosure, as other client applications (e.g., hunt group client applications 24, 26, 28) may be equally utilized.

Figure 2:
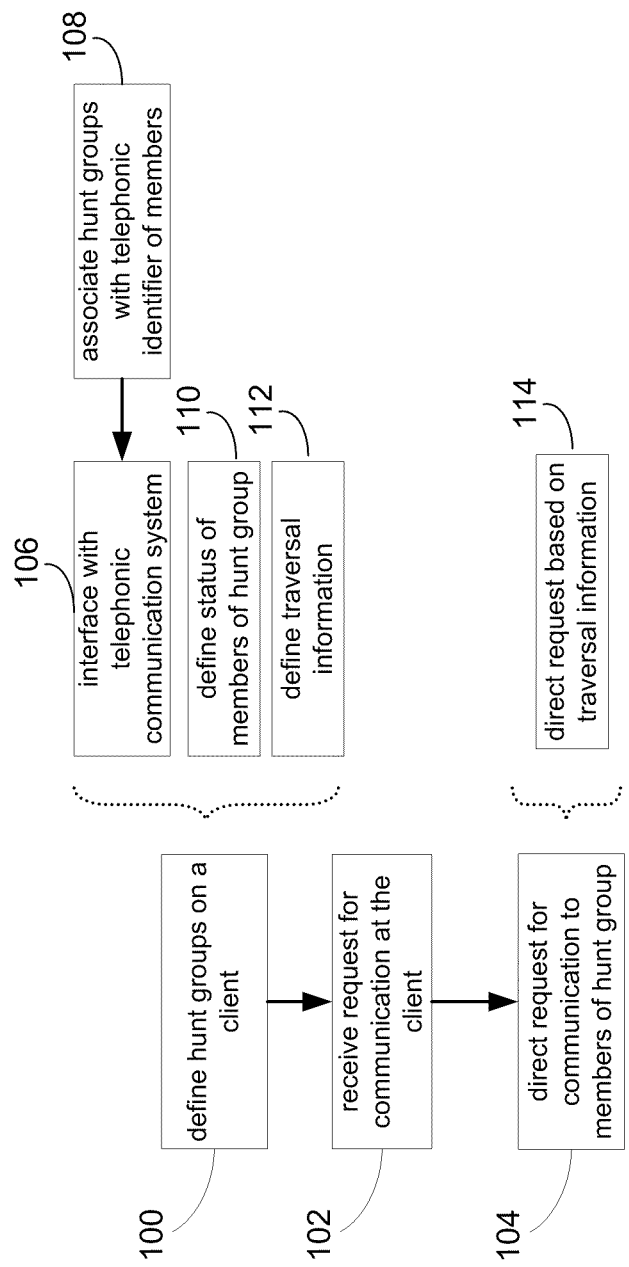
FIG. 2 is a flow chart of a process performed by the hunt group process of FIG. 1.

Referring also to FIG. 2, hunt group process 10 may define 100 (via, hunt group application 22 executing on, e.g., personal computer 38) one or more hunt groups on a client, wherein the one or more hunt group may be defined 100 based, at least in part, upon information specific to the client. Hunt group process 10 may also receive 102 a request for a communication session at the client. Finally, hunt group process 10 may direct 104 the request for the communication session to one or more members of the one or more hunt groups based, at least in part, upon the one or more defined hunt groups.

Figure 3:
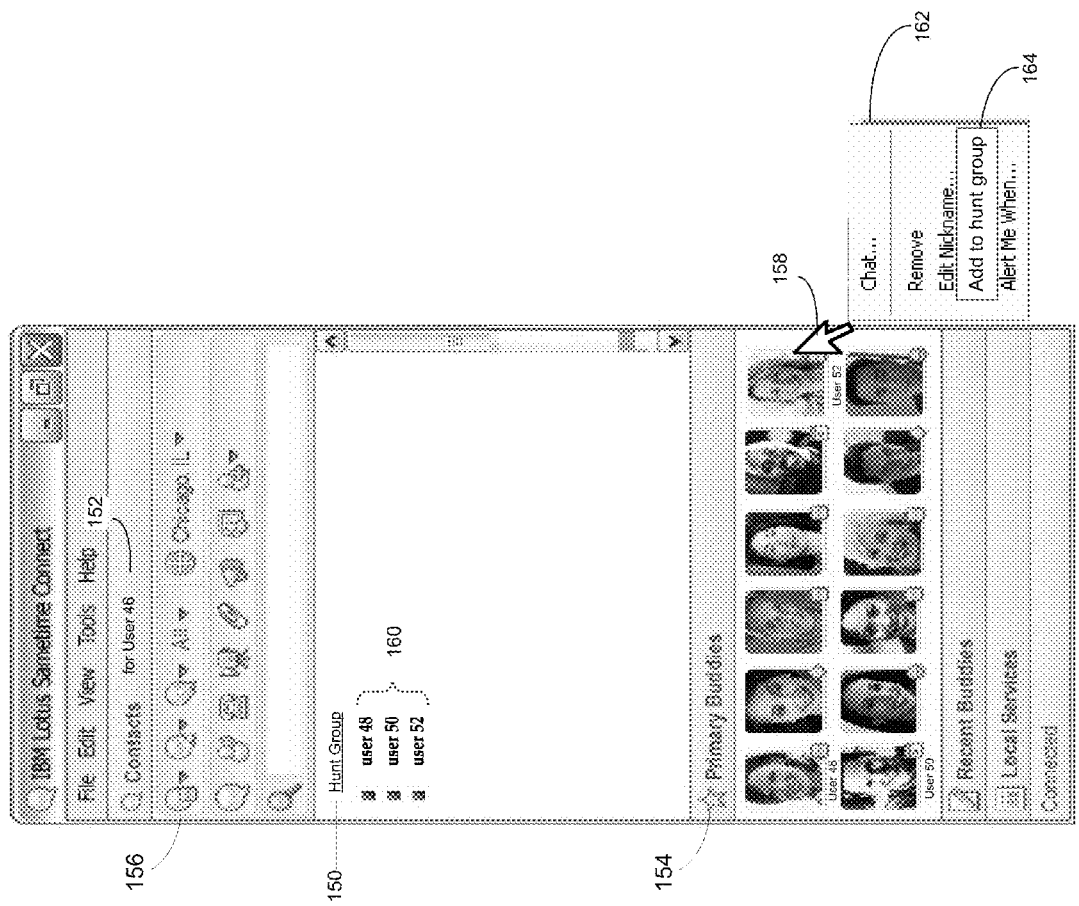
FIG. 3 diagrammatically depicts a hunt group application utilized by the hunt group process of FIG. 1.

Referring also to FIG. 3, hunt group process 10 may define 100 one or more hunt groups (e.g., hunt group 150) on a client (e.g., personal computer 38), wherein the one or more hunt groups may be defined 100 based, at least in part, upon information specific to the client. For example, hunt group process 10 (via, e.g., hunt group client application 22 executing on, e.g., personal computer 38) may enable a user (e.g., user 46) to define 100 one or more hunt groups (e.g., hunt group 150) based, at least in part, upon information specific to a client (e.g., hunt group client application 22 executing on, e.g., personal computer 38).

The information specific to the client may include one or more of: user information, one or more contact lists, and presence information. User information (e.g., user login 152) may include, but is not limited to, information sufficient to identify the user (e.g., user 46) that may be utilizing hunt group process 10 (via, e.g., hunt group client application 22 executing on, e.g., personal computer 38) to define 100 the one or more hunt groups (e.g., hunt group 150). One or more contacts lists (e.g., contact list 154) may include, but are not limited to, a list of other users (e.g., user 48, user 50, user 52) that may be associated with, e.g., user 46. Finally, and as will be discussed in greater detail below, presence information (illustrated via, e.g., presence indicators 156) may include, but is not limited to, information relevant to the status of one or more members (e.g., user 46).

Illustratively, hunt group process 10 may enable, e.g., user 46 to define 100 hunt group 150 by utilizing on-screen pointer 158 to select one or more members (e.g., members 160, discussed in greater detail below) of hunt group 150. That is, for example, when user 46 selects, e.g., user 52 utilizing on-screen pointer 158, dialogue box 162 may appear. Dialogue box 162 may include, but is not limited to, add to hunt group option 164, which may enable user 46 to define 100 user 52 as a member of hunt group 150. This is not intended to be a limitation of the present disclosure, however. One of skill in the art will appreciate that any number of means may be sufficient to define one or more users as a member of one or more hunt groups (e.g., directly entering the name of a user, etc.).

Defining 100 the one or more hunt groups may also include interfacing 106 with a telephonic communication system. Telephonic communication systems may include, but are not limited to, private branch exchanges. For example, Instant Messaging and Presence (IMPP) systems, e.g., Sametime Unified Telephony, may provide integration with telephonic communication systems. Further, interfacing 106 with the telephonic communication system may include associating 108 the one or more hunt groups (e.g., hunt group 150) with a telephonic identifier (not shown) of the one or more members (e.g., users 46, 48, 50, 52). For example, a telephonic identifier (e.g., telephone number, extension, etc.) for user 52 may include a sequence of numbers (e.g., 75862) specific to the telephone of user 52. Thus, hunt group process 10 may interface 106 with a telephonic communication system to associate 108, e.g., hunt group 150 with the telephonic identifier of user 52 (e.g., a member of hunt group 150).

Additionally, hunt group process 10 may receive 102 a request for a communication session at the client (e.g., hunt group client application 22 executing on, e.g., personal computer 38). Requests for communication sessions may include, but are not limited to: telephone calls, chat requests, and the like. For example, user 48 may initiate a request for a communication session (e.g., telephone call) by dialing a telephonic extension associated with user 46, who may be utilizing hunt group application 22 executing on personal computer 38.

Hunt group process 10 may then direct 104 the request for the communication session to one or more members of the one or more hunt groups (e.g., hunt group 150) based, at least in part, upon the one or more defined hunt groups (e.g., hunt group 150). As mentioned above, hunt group process 10 may enable a user (e.g., user 46) to define 100 one or more members (e.g., members 164) of a hunt group (e.g., hunt group 150). Additionally, presence information may define 110 a status of the one or more members (e.g., members 164) of the one or more hunt groups (e.g., hunt group 150). A status of the one or more members (e.g., user 46, user 48, user 50, user 52) may include, but is not limited to: online, offline, available, unavailable, mobile, telephone call in-progress, and location. Accordingly, hunt group process 10 may direct 104 requests for communication sessions utilizing presence information.

Further, defining 100 the one or more hunt groups (e.g., hunt group 150) by hunt group process 10 may also include defining 112 traversal information, wherein traversal information may include one or more of: an order of the one or more members; and presence rules based, at least in part, upon the presence information. Moreover, the request for the communication session may be directed 114 based, at least in part, upon the traversal information. Presence rules may include, but are not limited to: directing 104 the request for communication session to the desired user (e.g., user 46) of the one or more hunt groups (e.g., hunt group 150) when presence information defines 110 a status of, e.g., user 46 as being one or more of: available, online, non-mobile, mobile, and at a specified location; and directing 104 the request for communication session to another member (e.g., user 50) of the one or more hunt groups (e.g., hunt group 150) when presence information defines 110 a status of, e.g., user 46 as being one or more of: unavailable, offline, already participating in a telephone call, non-mobile, mobile, and not at a specified location. This is not intended to be a limitation of the present disclosure, however. One of skill in the art will appreciate that any number presence rules may be sufficient to define 112 traversal information for the one or more hunt groups (e.g., directing 104 requests for communication sessions to a user even when that user may be participating in a telephone call).

Illustratively, for the purposes of the following example, it may be assumed that hunt group process 10 enabled, e.g., user 46 to define 110 (e.g., utilizing on-screen pointer 158 and presence indicators 156) its status as being online, available, and not currently participating in a telephone call. Thus, when hunt group process 10 receives 102 (via hunt group application 22 executing on personal computer 38) a request for a communication session from, e.g., user 48, hunt group process 10 may direct 114 the request to user 46 (e.g., utilizing hunt group application 22 executing on personal computer 38) based on the traversal information (e.g., a defined 112 presence rule that directs 104 incoming telephone calls to the desired user when the desired user is available).

Alternatively, and for the purposes of the following example, it may be assumed that hunt group process 10 enabled, e.g., user 46 to define 110 (e.g., utilizing on-screen pointer 158 and presence indicators 156) its status as being online, unavailable, and currently participating in a telephone call. Thus, when hunt group process 10 receives 102 (via hunt group application 22 executing on personal computer 38) the request for a communication session (e.g., telephone call) from, e.g., user 48, hunt group process 10 may direct 114 the telephone call to another member 164 (e.g., user 52) of hunt group 150 based on the traversal information (e.g., a defined 112 presence rule that directs 104 incoming telephone calls to other members 164 of hunt group 150 when the desired user is already participating in a telephone call).

This is not intended to be a limitation of this disclosure, however. One of skill in the art will appreciate that requests for communications may be directed 114 based upon other traversal information. For example, user 46 may have defined 112 traversal information that, e.g., directs 114 requests for communications based upon the user that requested the communication session (e.g., user 48), or a time period (e.g., after 5:00 pm ET). In such an instance where traversal information may be defined 112 based upon the user that requested the communication session, hunt group process 10 may direct 114 requests for communications from, e.g., user 48, to another user (e.g., user 50). Additionally/alternatively, in such an instance where traversal information may be defined 112 based upon a time period, hunt group process 10 may direct 114 requests for communications occurring, e.g., after 5:00 pm ET to another user (e.g., user 52).

Additionally, and as mentioned above, traversal information may include an order of the one or more members (e.g., members 160). Thus, hunt group process 10 may also direct 104 requests for communications from, e.g., user 48, to another user (e.g., user 50) based upon the order in which members 164 appear in hunt group 150.

Finally, hunt group process 10 may store the defined 100 hunt groups (e.g., hunt group 150) for later retrieval by a user (e.g., user 46). Additionally, hunt group process 10 may enable a user (e.g., user 46) to selectively enable a hunt group (e.g., hunt group 150) when desired.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method comprising:
defining plurality of hunt groups on a client, by a computing device, wherein the plurality of hunt groups are defined based, at least in part, upon information specific to the client;
storing the plurality of defined hunt groups;
enabling one of the plurality of stored hunt groups in response to a user request;
receiving a request for a communication session at the client; and
directing the request for the communication session to one or more members of the one of the plurality of hunt groups based, at least in part, upon the plurality of defined hunt groups, wherein the request for the communication session is directed to a first member of the one or more members of the one of the plurality of hunt groups when presence information defines a second member of the one or more members of the one of the plurality of hunt groups as already participating in another communication session;
wherein directing the request for the communication session is further based upon, at least in part, the originator of the request for the communication session and based upon, at least in part, the specific location of the client;
wherein defining the plurality of hunt groups includes defining traversal information including an order of the one or more members of the one of the plurality of hunt groups that the request for the communication session is directed to, wherein the traversal information includes presence rules based, at least in part, upon the presence information and a time period when the request for the communication session is received, wherein receiving the request for the communication session during the time period determines another member of the one or more members the request is directed.

2. The computer-implemented method of claim 1 wherein information specific to the client includes one or more of: user information, one or more contact lists, and the presence information.

3. The computer-implemented method of claim 2 wherein the presence information defines a status of at least one member of the one or more members of the one of the plurality of hunt groups.

4. The computer-implemented method of claim 1 wherein directing the request for the communication session is based, at least in part, upon the traversal information.

5. The computer-implemented method of claim 1 wherein defining the plurality of hunt groups further includes interfacing with a telephonic communication system.

6. The computer-implemented method of claim 5 wherein interfacing with the telephonic communication system includes associating the plurality of hunt groups with a telephonic identifier of at least one member of the one or more members.

7. A computer program product residing on a non-transitory computer readable medium having a plurality of instructions stored thereon which, when executed by a processor, cause the processor to perform operations comprising:
defining a plurality of hunt groups on a client, wherein the plurality of hunt groups are defined based, at least in part, upon information specific to the client;
storing the plurality of defined hunt groups;
enabling one of the plurality of stored hunt groups in response to a user request;
receiving a request for a communication session at the client; and
directing the request for the communication session to one or more members of the one of the plurality of hunt groups based, at least in part, upon the plurality of defined hunt groups, wherein the request for the communication session is directed to a first member of the one or more members of the one of the plurality of hunt groups when presence information defines a second member of the one or more members of the one of the plurality of hunt groups as already participating in the communication session;
wherein directing the request for the communication session is further based upon, at least in part, the originator of the request for the communication session and based upon, at least in part, the specific location of the client;
wherein defining the plurality of hunt groups includes defining traversal information including an order of the one or more members of the one of the plurality of hunt groups that the request for the communication session is directed to, wherein the traversal information includes presence rules based, at least in part, upon the presence information and a time period when the request for the communication session is received, wherein receiving the request for the communication session during the time period determines another member of the one or more members the request is directed.

8. The computer program product of claim 7 wherein information specific to the client includes one or more of: user information, one or more contact lists, and the presence information.

9. The computer program product of claim 8 wherein the presence information defines a status of at least one member of the one or more members of the one of the plurality of hunt groups.

10. The computer program product of claim 7 wherein directing the request for the communication session is based, at least in part, upon the traversal information.

11. The computer program product of claim 7 wherein defining the plurality of hunt groups further includes interfacing with a telephonic communication system.

12. The computer program product of claim 11 wherein interfacing with the telephonic communication system includes associating the plurality of hunt groups with a telephonic identifier of at least one member of the one or more members.

13. A computing system comprising:
a processor;
a memory module coupled with the processor;
a first software module executable by the processor and the memory module configured to define a plurality of hunt groups on a client, wherein the plurality of hunt groups are defined based, at least in part, upon information specific to the client;
a second software module configured to store the plurality of defined hunt groups;
a third software module configured to enable one of the plurality of stored hunt groups in response to a user request;
a fourth software module configured to receive a request for a communication session at the client; and
a fifth software module configured to direct the request for the communication session to one or more members of the one of the plurality of hunt groups based, at least in part, upon the plurality of defined hunt groups, wherein the request for the communication session is directed to a first member of the one or more members of the one of the plurality of hunt groups when presence information defines a second member of the one or more members of the one of the plurality of hunt groups as already participating in the communication session;
wherein directing the request for the communication session is further based upon, at least in part, the originator of the request for the communication session and based upon, at least in part, the specific location of the client;
wherein defining the plurality of hunt groups includes defining traversal information including an order of the one or more members of the one of the plurality of hunt groups that the request for the communication session is directed to, wherein the traversal information includes presence rules based, at least in part, upon the presence information and a time period when the request for the communication session is received, wherein receiving the request for the communication session during the time period determines another member of the one or more members the request is directed.

14. The computing system of claim 13 wherein information specific to the client includes one or more of: user information, one or more contact lists, and the presence information.

15. The computing system of claim 14 wherein the presence information includes a status of at least one member of the one or more members of the one of the plurality of hunt groups.

16. The computing system of claim 13 wherein the fifth software module configured to direct the request for the communication session is further configured to:
direct the request for the communication session based, at least in part, upon the traversal information.

17. The computing system of claim 13 wherein the first software module configured to define the plurality of hunt groups on a client is further configured to interface with a telephonic communication system.

18. The computing system of claim 17 wherein interfacing with the telephonic communication system includes associating the plurality of hunt groups with a telephonic identifier of at least one member of the one or more members.

* * * * *